(12) United States Patent
Taylor et al.

(10) Patent No.: US 7,079,969 B2
(45) Date of Patent: Jul. 18, 2006

(54) DYNAMIC ARTEFACT COMPARISON

(75) Inventors: Benjamin Roller Taylor, Stone (GB); Geoffrey McFarland, Dursley (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/498,124

(22) PCT Filed: Mar. 6, 2003

(86) PCT No.: PCT/GB03/00961

§ 371 (c)(1),
(2), (4) Date: Jun. 9, 2004

(87) PCT Pub. No.: WO03/074968

PCT Pub. Date: Sep. 12, 2003

(65) Prior Publication Data

US 2005/0005465 A1    Jan. 13, 2005

(30) Foreign Application Priority Data

Mar. 6, 2002    (GB) ................... 0205332.0

(51) Int. Cl.
*G01P 21/00*    (2006.01)
*G01C 17/38*    (2006.01)
(52) U.S. Cl. ....................................... 702/95
(58) Field of Classification Search ............ 702/85, 702/94, 95, 127, 155–158, 167, 168; 33/545, 33/546, 1 M
See application file for complete search history.

(56) References Cited

U.S. PATENT DOCUMENTS

| | | | |
|---|---|---|---|
| 4,991,304 A | | 2/1991 | McMurtry |
| 5,007,006 A | * | 4/1991 | Taylor et al. ............. 702/97 |
| 5,257,460 A | | 11/1993 | McMurtry |
| 5,426,861 A | | 6/1995 | Shelton |
| 5,594,668 A | * | 1/1997 | Bernhardt et al. ......... 702/95 |
| 5,610,846 A | * | 3/1997 | Trapet et al. ............. 702/95 |
| 5,895,442 A | | 4/1999 | Arndt et al. |
| 6,131,301 A | | 10/2000 | Sutherland |
| 6,434,846 B1 | * | 8/2002 | McMurtry et al. ......... 33/502 |

FOREIGN PATENT DOCUMENTS

| | | |
|---|---|---|
| DE | 198 30 646 | 1/2000 |
| DE | 100 50 795 A1 | 7/2001 |
| EP | 0 769 677 A2 | 10/1996 |

* cited by examiner

*Primary Examiner*—John Barlow
*Assistant Examiner*—D. Pretlow
(74) *Attorney, Agent, or Firm*—Oliff & Berridge, PLC

(57) ABSTRACT

A method of inspecting a series of workpieces using a coordinate measuring apparatus, comprising the steps of: measuring a calibrated artefact on a coordinate measuring apparatus at a fast speed 28; generating an error map corresponding to the difference between the calibrated artefact and the measured artefact 30; measuring subsequent workpieces at the same fast speed 34 and correcting the measurements of the subsequent workpieces using the error map 36. The artefact may be one of the workpieces.

10 Claims, 2 Drawing Sheets

DYNAMIC ARTEFACT COMPARISON

This invention relates to co-ordinate measuring apparatus for inspecting the dimensions of workpieces. Co-ordinate measuring apparatus include, for example, co-ordinate measuring machines (CMM), machine tools, manual co-ordinate measuring arms and inspection robots.

It is common practice after workpieces have been produced, to inspect them on a co-ordinate measuring machine (CMM) having a quill onto which a probe is mounted which can be driven in three orthogonal directions, X,Y,Z, within a working volume of the machine.

Inaccuracies caused by the dynamic deflections of the probe may be reduced by causing the probe to travel very slowly as it contacts the workpiece surface.

It is usual, prior to taking any measurements, to include a calibration or "datuming" cycle, in which the probe is calibrated by touching surfaces of a reference object at the same slow speed. This enables the calculation of offsets which are stored and used to correct the subsequent measurement readings for such factors as the diameter of the probe stylus ball.

Our previous U.S. Pat. No. 4,991,304 discloses a method of inspecting a series of workpieces using a coordinate measuring machine (CMM), in which a probe is first calibrated or datumed for each intended direction of probing movement by touching it at a slow speed against a reference object such as a datum ball to provide a set of correction offsets which are stored in the computer and used for subsequent measurement.

The first workpiece to be measured is put on the CMM table and a set of points on the surface of the workpiece are measured at a slow speed to allow accurate readings to be taken. Measurement of the first workpiece is then repeated at a fast speed. The difference between the slow speed readings and the fast speed readings is calculated and stored.

The stored error value for each measured point takes into account the dynamic deflections of the machine structure at the faster speed.

The next workpiece to be measured is set up on the CMM table and readings are taken at the fast speed. At this speed the readings are inaccurate but repeatable. Each fast reading is adjusted by adding the corresponding stored error value and thus compensating for errors induced by fast reading.

This method has the advantage that a whole series of nominally identical workpieces can be measured at fast speed by making a dynamic error map from only one workpiece.

However the disadvantage is that the CMM must be static error mapped to be able to measure the part accurately at slow speeds.

U.S. Pat. No. 5,895,442 discloses a method for increasing the measuring accuracy of a coordinate measuring apparatus when making form measurements of circular, cylindrical and spherically shaped geometric elements. A set of known forms (for example ring gauges) having respective diameters and defining circular-shaped or circular-segment shaped measurement lines have a predetermined first set of form deviations corresponding to the diameters and to the measurement lines. These known forms are located in different positions or planes (XY,XZ,YZ) of the coordinate measuring apparatus. These measurement lines are scanned at different speeds by the coordinate measuring apparatus to obtain a second set of form deviations. Corrective values are generated by comparing the first and second sets of form deviations. When real workpieces are measured on the coordinate measuring apparatus the software informs the user of a corresponding dataset having corrective values as soon as the selected measuring task shows that circularly-shaped, cylindrical or spherically-shaped geometric elements are to be measured with the diameter and scanning speed lying in the doubtful range. The user can then decide whether to use this corrective method.

The present invention provides a method of inspecting a series of workpieces using a coordinate measuring apparatus, in which a workpiece-sensing probe is moved into a position-sensing relationship with each workpiece and a position reading taken, the method comprising the following steps (in any suitable order):
   (a) calibrating an artefact not using said coordinate measuring apparatus;
   (b) measuring said artefact with the coordinate measuring apparatus at a desired speed, the desired speed being used to measure subsequent parts;
   (c) generating an error map or error function corresponding to the difference between the calibration of said artefact and the measurement of said artefact;
   (d) measuring subsequent workpieces with the coordinate measuring apparatus at said desired speed; and
   (e) correcting the measurements of the subsequent workpieces using the error map or error function and thereby removing or reducing dynamic errors.

The artefact may comprise a workpiece in the series of workpieces. Alternatively the artefact may have features, the size and location of which approximate the workpiece. The artefact may have the same surface finish as the workpiece or alternatively may mimic the surface finish of the workpiece.

The coordinate measuring apparatus may be corrected for geometric errors or not corrected for geometric errors.

The workpiece-sensing probe may be a contact probe, such as an analogue (scanning) probe or a touch trigger probe. Alternatively the workpiece-sensing probe may be a non-contact probe, such as a capacitance, inductance or optical probe.

Preferred embodiment of the invention will now be described by way of example with reference to the accompanying drawings wherein.

Figure 1:
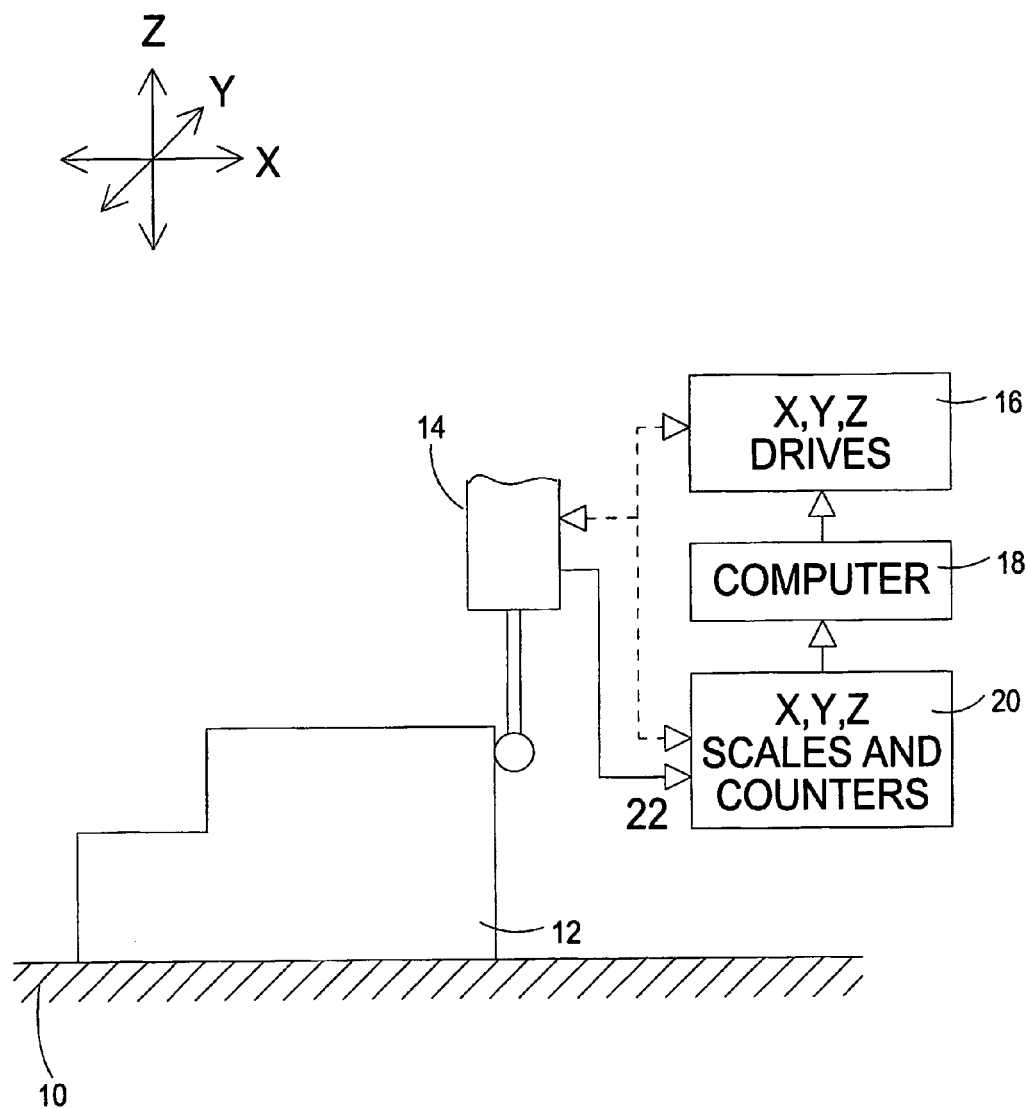
FIG. 1 is a schematic diagram of a coordinate measuring machine (CMM)

The coordinate measuring machine (CMM) shown in FIG. 1 comprises a table 10 upon which may be placed a workpiece 12. Preferably this is done by automatic means (not shown) which places each of a succession of substantially identical workpieces 12 from a production run in at least nominally the same position and orientation on table 10. An analogue probe 14 is mounted in a quill (not shown) of the machine, although other types of probes (including touch trigger probes) may also be used. The quill and probe may move in X,Y and Z directions under the action of X,Y and Z drives 16, controlled by computer 18. X,Y and Z scales 20 (which include counters for the outputs of the scales) show the instantaneous co-ordinates of the position of the quill in which the probe 14 is mounted in three dimensions. Signals 22 from the probe 14 indicating the deflection of the probe stylus are combined with the readings from the X,Y and Z scales 20 of the CMM to calculate the position of the stylus tip, and thus the surface of the workpiece. Alternatively with a touch trigger probe, a signal indicating that the probe has contacted the surface of the workpiece 12 freezes the scales 20 and the computer 18 takes a reading of the X,Y,Z co-ordinates of the workpiece surface.

As thus far described, the machine is conventional. The computer 18 contains a program which causes the probe 14 to scan the surface of the workpiece, or for a touch trigger probe to contact the surface of the workpiece 12 at a plurality of different points, sufficient to take all the required dimensions and form of the workpiece for the inspection operation required.

Figure 2:
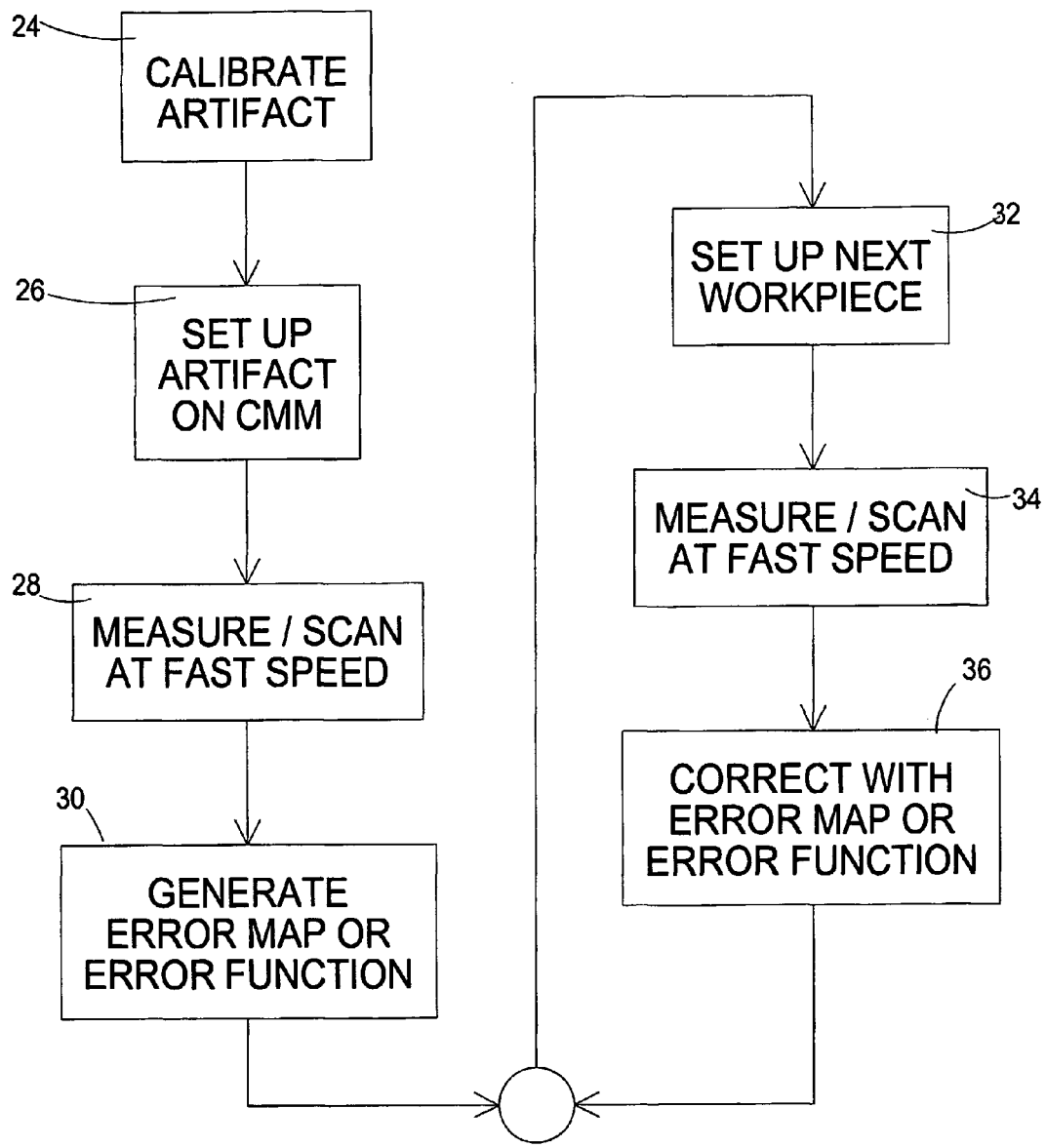
FIG. 2 is a flow chart of the method.

Referring to FIG. 2, the following procedure is used in the present inspection method. A workpiece, from the series of workpieces to be measured, is first calibrated 24. The dimensions and form of the workpiece are calibrated to the best possible standard either on a very accurate machine, for example by form measuring, or on a standard machine by measuring the workpiece many times or in many orientations. This workpiece may now be used as a calibrated master.

Alternatively a calibrated artefact could be used which approximates the workpiece, in particular having features the size and/or location of which match the features of the workpiece. The artefact could, for example, be calibrated on a roundness machine. It is desirable that the artefact has the same surface finish as the series of workpieces to be measured or scanned or which mimics the surface finish of the series of workpieces.

The calibrated master or artefact is set up on a coordinate positioning machine, for example a CMM 26 and scanned or measured at a desired speed 28. The desired speed is the speed at which the rest of the series of workpieces will also be measured and is preferably a fast speed to maximise throughput. This desired speed must allow the coordinate positioning machine to perform the scan or measurement repeatably within desired limits.

An error map is generated 30 between the results from the measurement or scan of the calibrated master or artefact at the desired speed and the known dimensions and form of the calibrated master or artefact (derived from calibration). Alternatively, an error function, for example a polynomial error function, could be used.

Subsequent workpieces in the series of workpieces are set up on the CMM 32 and measured or scanned by the CMM 34. The data relating to these subsequent workpieces is corrected by the error map or error function 36. Desirably the subsequent parts are measured or scanned at substantially the same speed as before. In addition, as the measuring system dynamics perform differently depending on where it is in the machine's working volume, the subsequent workpieces are desirably placed in substantially the same position as that of the calibrated master or artefact.

This method allows a coordinate positioning machine to perform high accuracy high-speed measurements.

As the method involves comparing dynamic errors on a calibrated master or artefact with those on a workpiece identical or similar to the calibrated artefact, there is no requirement to correct for static errors. Use of a calibrated master or artefact thus results in there being no requirement for the CMM to be corrected for geometric errors. This has the advantage of speeding up the process and reducing calibration costs as the CMM will no longer require regular calibration.

This method therefore compensates for both dynamic and static errors without requiring correction of the geometric errors of the CMM.

In a preferred variation of the above method, a part coordinate system of the calibrated master or artefact may be set up, for example, by using datum features on the master or artefact. This may be done before or after the master workpiece or artefact is calibrated on the high accuracy CMM. The accurate measurement of the calibrated master or artefact, obtained during calibration, is then stored in this part coordinate system.

The same part co-ordinate system is then set up on the CMM on which the first workpiece from the series of workpieces is to be measured at high speed. As before, this may be set up by using datum features on the workpiece. The measurement and error correction thus occur in the part co-ordinate system, not the CMM co-ordinate system. This enables accurate data from the calibration of the master or artefact to be easily related to the data collected from the series of workpieces.

This method is also suitable for use with a contact probe, such as an optical, capacitance or inductance probe.

The invention claimed is:

1. A method of inspecting a series of workpieces using a coordinate measuring apparatus, in which a workpiece-sensing probe is moved into a position-sensing relationship with each workpiece and a position reading taken, the method comprising the following steps (in any suitable order);
    (a) calibrating an artefact not using said coordinate measuring apparatus;
    (b) measuring said artefact with the coordinate measuring apparatus at a desired speed, the desired speed being used to measure subsequent parts;
    (c) generating an error map or error function corresponding to the difference between the calibration of said artefact and the measurement of said artefact;
    (d) measuring subsequent workpieces with the coordinate measuring apparatus at said desired speed; and
    (e) correcting the measurements of the subsequent workpieces using the error map or error function and thereby removing or reducing dynamic errors.

2. A method of inspecting a series of workpieces according to claim 1 wherein the artefact comprises a workpiece in the series of workpieces.

3. A method of inspecting a series of workpieces according to claim 1 wherein the artefact has features, the size and location of which approximate the workpiece.

4. A method of inspecting a series of workpieces according to claim 1 wherein the artefact has the same surface finish as the workpiece.

5. A method of inspecting a series of workpieces according to claim 1 wherein the surface finish of the artefact mimics the surface finish of the workpiece.

6. A method of inspecting a series of workpieces according to claim 1 wherein the coordinate measuring apparatus is corrected for geometric errors.

7. A method of inspecting a series of workpieces according to claim 1 wherein the coordinate measuring apparatus is not corrected for geometric errors.

8. A method of inspecting a series of workpieces according claim 1 wherein a part coordinate system is set up for the artefact, and wherein measurement and error data of the workpiece are stored within this part coordinate system.

9. A method of inspecting a series of workpieces according to claim 1 wherein the workpiece-sensing probe is a contact probe.

10. A method of inspecting a series of workpieces according to claim 1 wherein the workpiece-sensing probe is a non-contact probe.

* * * * *